United States Patent [19]

Stern et al.

[11] Patent Number: 5,097,321
[45] Date of Patent: Mar. 17, 1992

[54] THREE DIMENSIONAL ADAPTIVE DECODING SYSTEM AND METHOD

[75] Inventors: John Stern, Menlo Park; Luigi C. Gallo, Woodside; Douglas J. George, San Jose, all of Calif.

[73] Assignee: ACCOM, Menlo Park, Calif.

[21] Appl. No.: 408,027

[22] Filed: Sep. 15, 1989

Related U.S. Application Data

[63] Continuation-in-part of Ser. No. 345,066, Apr. 28, 1989, abandoned.

[51] Int. Cl.$^5$ .................... H04N 9/78; H04N 9/64
[52] U.S. Cl. ........................ 358/21 R; 358/31; 358/23
[58] Field of Search .................... 358/21 R, 31, 23

[56] References Cited

U.S. PATENT DOCUMENTS

| | | | |
|---|---|---|---|
| 4,258,385 | 3/1981 | Greenberg et al. | 358/22 |
| 4,641,180 | 2/1987 | Richter | 358/31 |
| 4,694,329 | 9/1987 | Belmares-Sarabia et al. | 358/80 |
| 4,754,322 | 6/1988 | Okuda et al. | 358/31 |
| 4,870,661 | 9/1989 | Yamada et al. | 358/13 |

FOREIGN PATENT DOCUMENTS

| | | | |
|---|---|---|---|
| 123280 | 9/1980 | Japan | 358/31 |
| 72889 | 4/1984 | Japan | 358/13 |
| 77782 | 5/1984 | Japan | 358/31 |
| 136191 | 6/1987 | Japan | |
| 2078054 | 12/1981 | United Kingdom | 358/31 |

OTHER PUBLICATIONS

Parker, N. W.; A Method of Obtaining the Advantages of I and Q Detection With Direct or Color Different Type Demodulators.
Kaiser, Arthur; "Comb Filter Improvement With Spurious Chroma Deletion"; *SMPTE Journal*, Jan. 1977; pp. 1-5.
Lagoni, W. A. et al.; "A Base-Band Comb Filter for Consumer Television Receivers"; *IEEE Transactions on Consumer Electronics*, vol. CE-26; Feb. 1980; pp. 94-98.
Teichner, Detief; "Three-Dimensional Pre- and Post--Filtering for PAL TV Signals"; *IEEE Transactions on Consumer Electronics*, vol. 34, No. 1, Feb. 1988; pp. 205-227.

*Primary Examiner*—John W. Shepperd
*Attorney, Agent, or Firm*—Flehr, Hohbach, Test, Albritton & Herbert

[57] ABSTRACT

A decoding system (10) receives a composite digital NTSC D2 input signal or a composite analog NTSC RS-170A input signal. The decoding system (10) decodes and sample rate converts to a component digital D1 output and a component analog RGB or Y(R-Y) (B-Y) output. A control panel (20) is connected to the decoding system (10) to provide digital control of the important decoding parameters to provide decoding flexibility. The composite video signal is supplied directly to an adaptive combiner (44), through a line comb filter (48) to the adaptive combiner (44), and through a frame comb filter (52) to the adaptive combiner (44). The composite video signal is also supplied to a frame transition or motion detector (58) and to a line transition or motion detector (60). If no frame transition or motion is detected, the adaptive combiner (44) utilizes frame based three dimensional decoding. When frame transition or motion is detected, the adaptive combiner (44) drops back to two dimensional line combing for the decoding. When line transition or motion is detected, the adaptive combiner drops back to supply the video signal directly to band pass filter (62) for bandpass decoding. Thus, for those parts of a scene in which there is motion or vertical detail, the decoding system 10 automatically adapts to line combing or bandpass decoding smoothly within the scene to give high apparent resolution in the scene.

52 Claims, 8 Drawing Sheets

THREE DIMENSIONAL ADAPTIVE DECODING SYSTEM AND METHOD

ORIGIN OF APPLICATION

This application is a continuation-in-part of application Ser. No. 07/345,066, filed April 28, 1989, now abandoned.

BACKGROUND OF THE INVENTION

1. Field of the Invention

The present invention relates generally to a system and method for decoding and sample rate converting video signals from composite to component form. More particularly, it relates to such a system and method in which decoding and sample rate conversion are accomplished with all digital circuitry by adapting to the characteristics of the video signal to eliminate visual artifacts while maintaining a maximum image quality. The system and method is especially useful for converting video information that has already been recorded in analog form to other formats, such as digital form, while enhancing the quality of images produced from the video information. The system and method is also useful for a variety of other post-production processing of video information.

2. Description of the Prior Art

L The state of the art of decoding and sample rate converting video signals from composite to component form is indicated by Teichner "Three Dimensional Pre- and Post-Filtering for PAL TV Signals," *IEEE Transactions on Consumer Electronics*, Vol. 34, No. 1, Feb. 1988, pp. 205-227. Briefly, when there is motion between frames of video signals, or transitions between adjacent lines, decoding the signals will produce artifacts in the form of false color information, moving dots and similar distracting defects in the images produced that are interpreted by a viewer as a low quality image. While the techniques disclosed by Teichner help to eliminate these artifacts, further development is required to maintain apparent high image resolution while eliminating the artifacts.

SUMMARY OF THE INVENTION

Accordingly, it is an object of this invention to provide a video signal composite to component decoding system and method that will maintain apparent high image resolution while eliminating visual artifacts which would otherwise be introduced by the decoding.

It is a further object of the invention to provide such a decoding system and method which provides digital control of important video correction and decoding parameters.

It is another object of the invention to provide such a decoding system and method that does not require any special pre-filtering in the encoding process beforehand.

It is still another object of the invention to provide such a decoding system and method which is able to make smooth transition among different decoding modes within a scene on a line-to-line and even a pixel-by-pixel basis.

The attainment of these and related objects may be achieved through use of the novel three dimensional adaptive decoding system and method herein disclosed. A three dimensional adaptive decoding system in accordance with this invention has a line comb filter and a frame comb filter connected to an input for a composite video signal representing a scene in a plurality of frames, each frame comprising a plurality of lines, each line comprising a plurality of pixels. A means selects within the scene from the unmodified composite video signal, a line comb filtered output signal from the line comb filter and a frame comb filtered output signal from the frame comb filter. A means is connected to the input for the composite video signal and to the means for selecting for detecting frame to frame motion or transition within the scene represented by the composite video signal. A means is connected to the input for the composite video signal and to the means for selecting for detecting line to line motion or transition within the scene represented by the composite video signal. The means for selecting is responsive to the means for detecting frame to frame motion or transition and to the means for detecting line to line motion or transition to select the frame comb filter modified output signal within the scene in the absence of frame to frame motion or transition, to select the line comb filter modified output signal within the scene in the presence of frame to frame motion, but in the absence of line to line motion or transition, and to select the unmodified composite video signal within the scene in the presence of both frame to frame motion and line to line motion or transition.

In the decoding process, a composite video signal representing a scene in a plurality of frames each comprising a plurality of lines is decoded. The composite video signal is filtered with a line comb filter. The composite video signal is filtered with a frame comb filter. The composite video signal is evaluated within the scene for frame to frame motion or transition. The composite video signal is evaluated within the scene for line to line motion or transition. The frame comb filter modified output signal is selected within the scene in the absence of frame to frame motion or transition. The line comb filter modified output signal is selected within the scene in the presence of frame to frame motion, but in the absence of line to line motion or transition. The unmodified composite video signal is selected within the scene in the presence of both frame to frame motion and line to line motion or transition.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
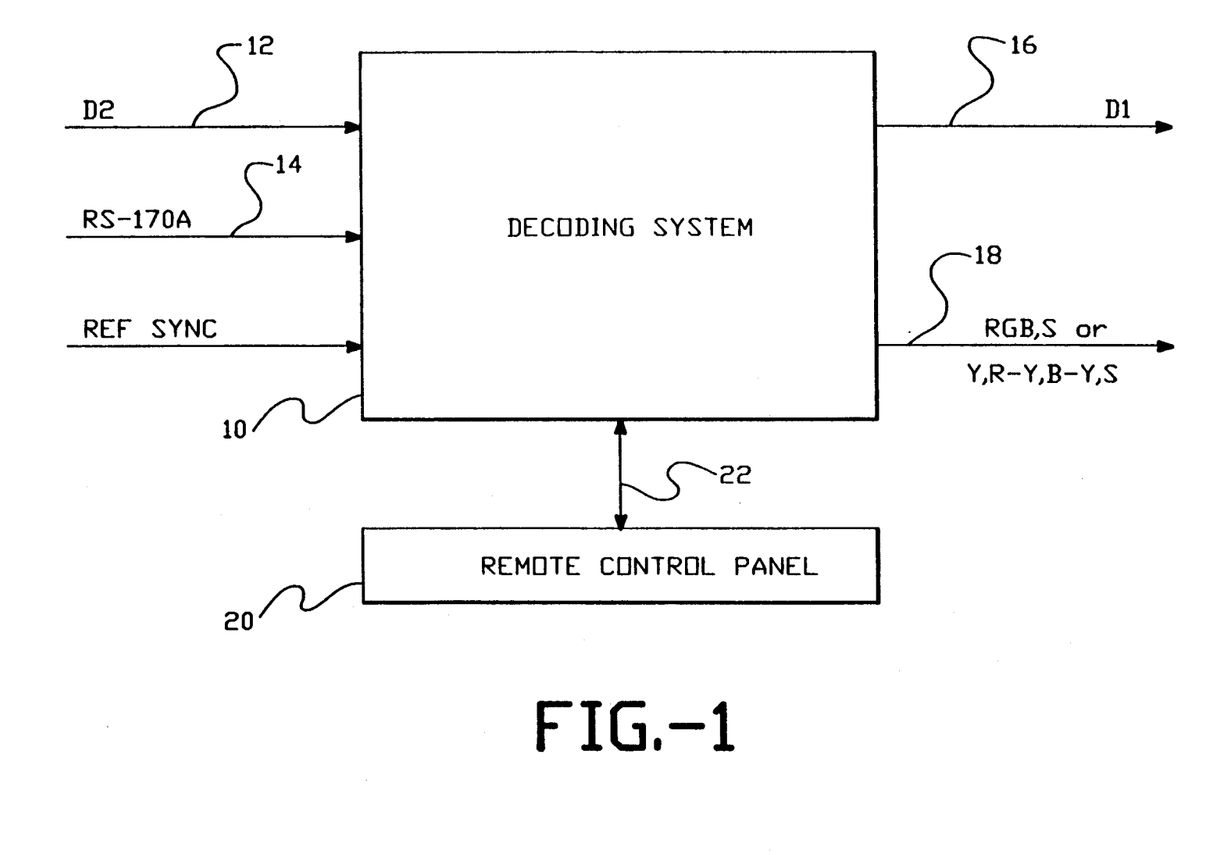
FIG. 1 is a block diagram of a decoding system in accordance with the invention.

Turning now to the drawings, more particularly to FIG. 1, there is shown a decoding system 10, which receives a composite digital NTSC D2 input signal on line 12 or a composite analog NTSC RS-170A input signal on line 14. The decoding system 10 decodes and sample rate converts to a component digital D1 output on line 16 and a component analog RGB or Y(R-Y)(B-Y) output on line 18. A control panel 20 is connected by line 22 to the decoding system 10 to provide digital control of the important decoding parameters to provide decoding flexibility.

Figure 2:
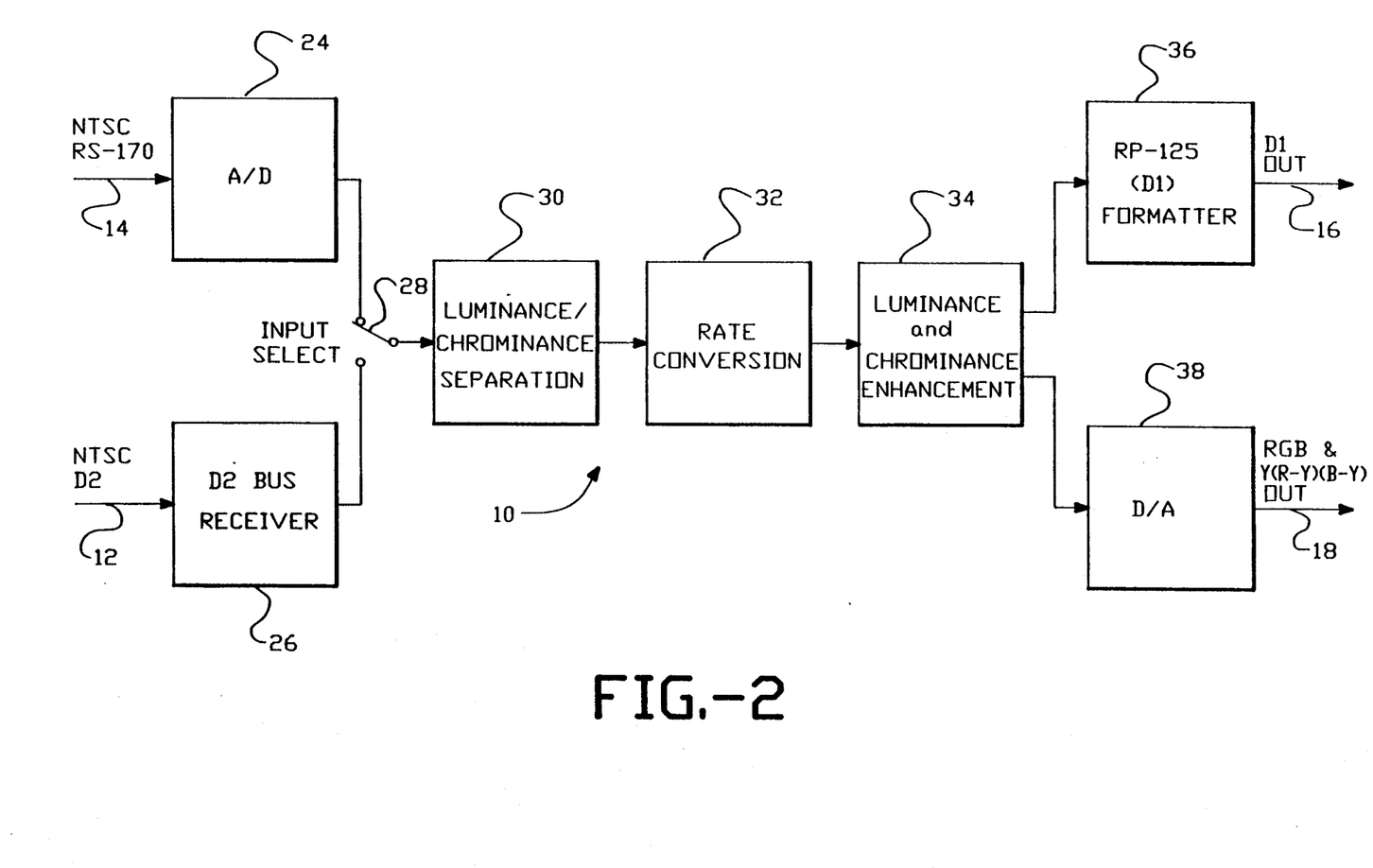
FIG. 2 is a more detailed combined block diagram and flow chart of the decoding system of FIG. 1.

FIG. 2 shows the basic functions that are provided within the decoding system 10. The composite analog NTSC RS-170A input at 14 is converted to digital form by an A/D converter 24. The composite NTSC D2 bus signal at 12 is received at 26. Switch 28 allows selection of the composite input signal to the decoding system 10. In the decoding system 10, the composite input signal is separated into its luminance and chrominance components at 30 and converted from a 14.3 MHz D2 rate to a 13.5 MHz D1 rate at 32. Enhancement of the luminance and chrominance components of the input signal is carried out at 34. Depending on the desired output, the enhanced signal is formatted as a D1 output by formatter 36 and supplied on line 16 or converted to analog form by a D/A converter 38 and supplied on line 18.

Figure 3:
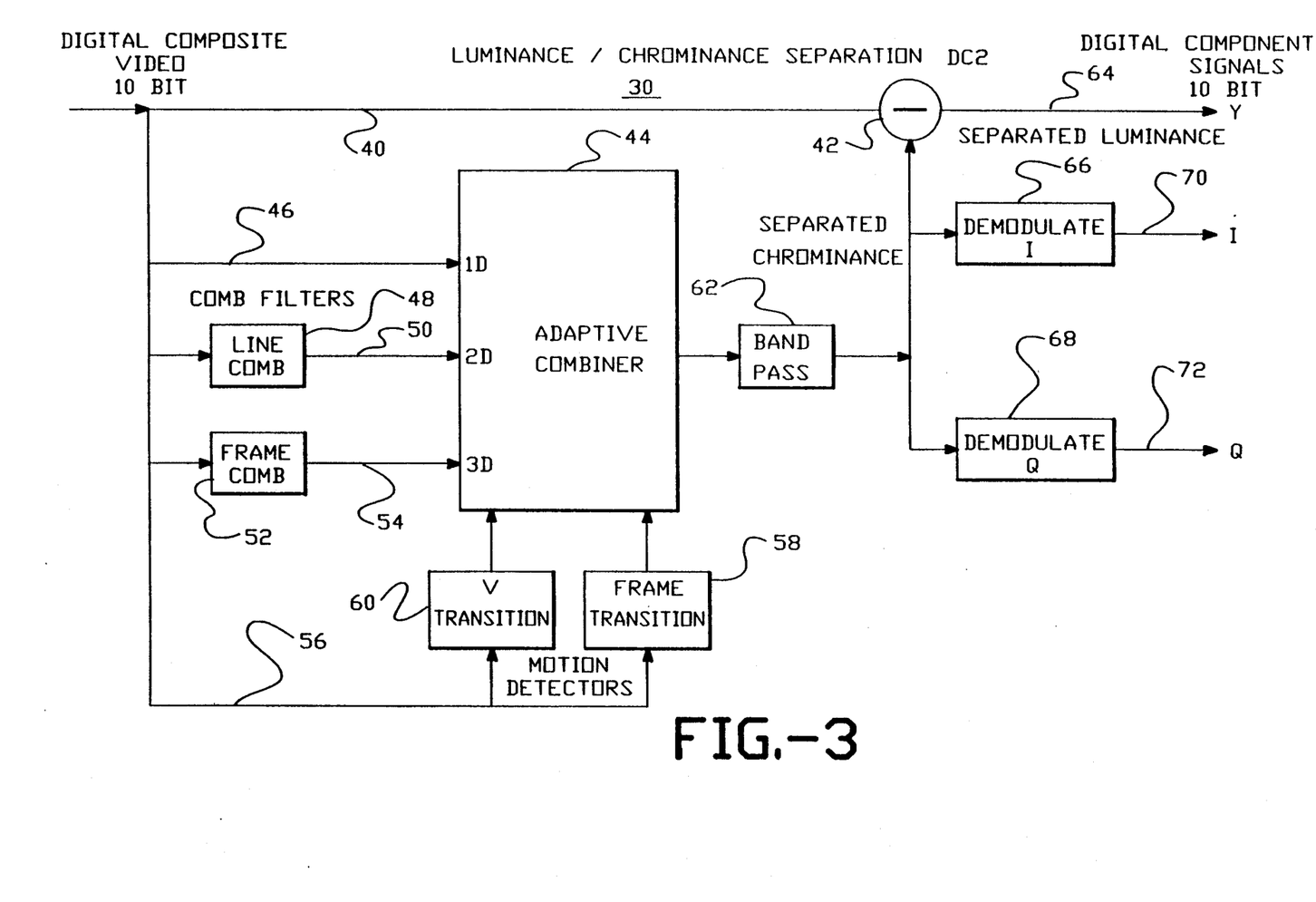
FIG. 3 is a block diagram of a portion of the decoding system of FIGS. 1 and 2.

Details of the luminance/chrominance separation 30 are shown in FIG. 3. The digital composite video signal is supplied on line 40 to a difference circuit 42. It is also supplied directly to an adaptive combiner 44 on line 46, through a line comb filter 48 on line 50 to the adaptive combiner 44, and through a frame comb filter 52 on line 54 to the adaptive combiner 44. The digital composite video signal is also supplied on line 56 to a frame transition or motion detector 58 and to a line transition or motion detector 60.

The function of the frame transition or motion detector 58 is to determine whether there is frame to frame motion in a scene represented by the video signal. If no frame transition or motion is detected, the adaptive combiner 44 utilizes frame based three dimensional decoding. The three dimensional process produces the very best decoding of video by eliminating the cross-luminance and cross-chrominance artifacts from the output picture. When frame transition or motion is detected, the adaptive combiner 44 drops back to two dimensional line combing for the decoding.

Similarly, the function of the line transition or motion detector 60 is to determine whether there is line to line transition or motion in a scene represented by the video signal. When such line transition or motion is detected, the adaptive combiner drops back to supply the video signal directly to band pass filter 62 for bandpass decoding. Thus, for those parts of a scene in which there is motion or vertical detail, the decoding system 10 automatically adapts to line combing or bandpass decoding smoothly within the scene. The transition or motion determinations and the changes in decoding mode selected on the basis of the determinations are carried out rapidly enough to allow the adaptation on a line-by-line or even a pixel-by-pixel basis within a line.

Figure 4:
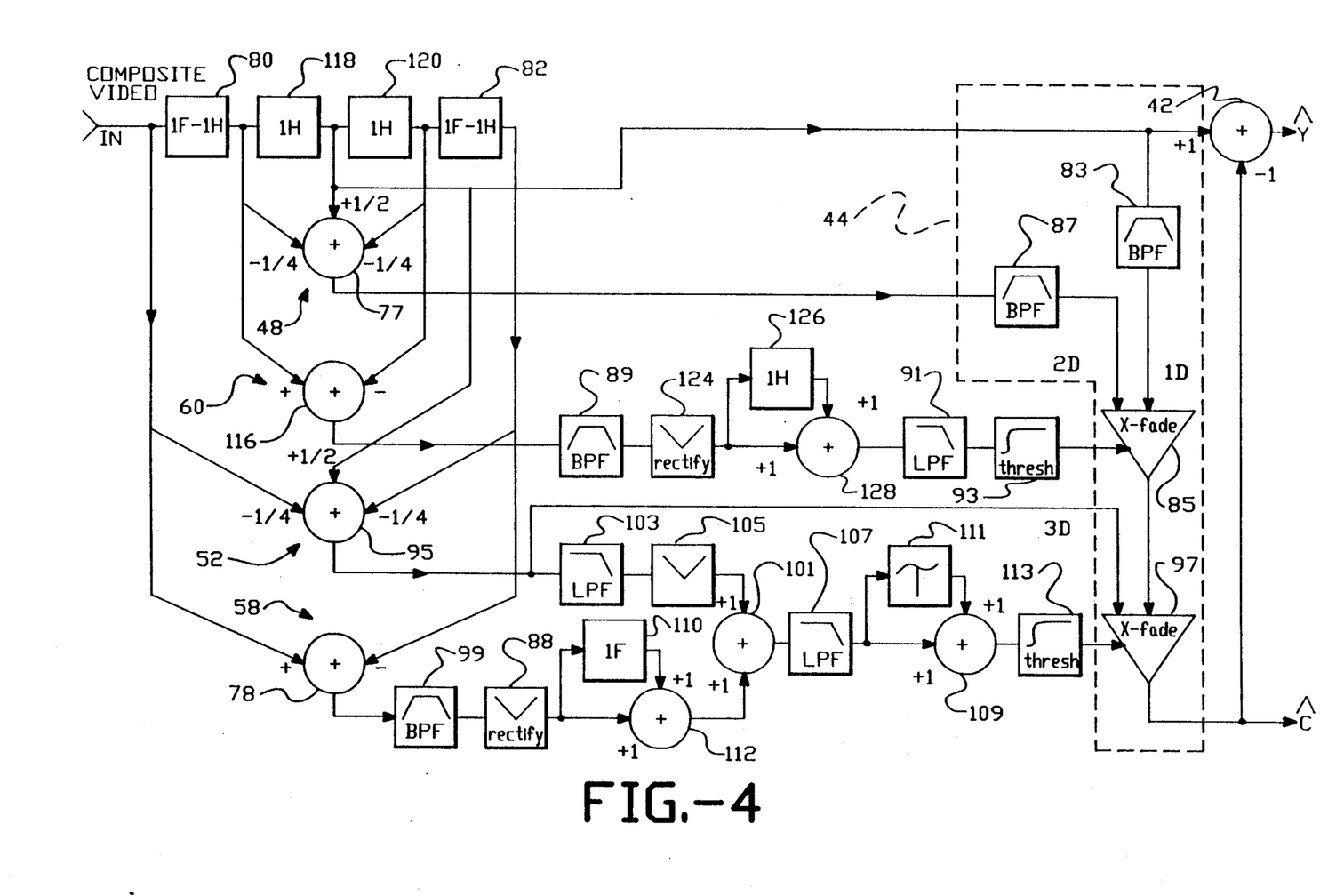
FIG. 4 is a block diagram of part of the decoding system portion shown in FIG. 3.

Details of the line and frame comb filters 48 and 52 and the transition or motion detectors 58 and 60 are shown in FIG. 4. A composite video input signal is supplied to delay element 80. In the line comb filter 48, the input to delay element 118 is divided by four and supplied to summing circuit 77. The output of delay element 118 is divided by two and supplied to the summing circuit 77. The output of the delay element 118 is also supplied to summing circuit 95. The output of delay element 120 is divided by four and supplied to the summing circuit 77. The unprocessed output of delay element 118 is supplied directly to summing circuit 42 and through bandpass filter 83 in the adaptive combiner 44 as a ID input to cross fade amplifier circuit 85. The output of the line comb filter 48 is supplied through bandpass filter 87 as a 2D input to the cross fade amplifier circuit 85.

In the line transition or motion detector 60, the output of delay element 80 and the output of delay element 120 are supplied as + and − inputs to summing circuit 116. The output of the summing circuit 116 is supplied through a bandpass filter 89 to rectifier 124. The output of rectifier 124 is supplied undelayed and delayed by 1H delay element 126 to summing circuit 128. The output of the summing circuit 128 is supplied through a low pass filter 91 and a threshold detector 93 as a control input for the cross fade amplifier circuit 85.

In the frame comb filter 52, the composite video input signal and the output of delay element 82, each divided by four, are supplied as negative inputs to summing circuit 95. The output of delay element 118, divided by two, is supplied as a positive input to the summing circuit 95. The output of the summing circuit 95 is supplied as a 3D input to cross fade amplifier 97. The other input to the cross fade amplifier 97 is the output of the cross fade amplifier 85.

In the frame transition or motion detector 58, the composite video input and the output of delay element 82 are supplied as positive and negative inputs to summing circuit 78. The output of the summing circuit 78 is supplied through bandpass filter 99 to rectifier 88. The output of rectifier 88 is supplied undelayed and delayed by 1F delay element 110 to summing circuit 112. The output of the summing circuit 112 is supplied to summing circuit 101, which serves to sum together the two legs of the frame motion detector. The other input to summing circuit 101 is the output of the summing circuit 95 in the frame comb filter 52, supplied through low pass filter 103 and rectifier 105. The output of the summing circuit 101 is supplied through a low pass filter 107 as an undelayed input to summing circuit 109 and through delay element 111 as a delayed input to the summing circuit 109. The output of the summing circuit 109 is supplied through threshold, which functions as a comparator, which compares the frame motion against the threshold, as a control input to the cross fade amplifier 97.

There are several important novel aspects of the line and frame comb filters 48 and 52 and the transition or motion detectors 58 and 60 of FIG. 4. The outputs of the line motion summing circuit 116 and the frame motion summing circuit 78 each contain both luminance and chrominance components. The bandpass filters 89 and 99 eliminate unwanted components in the outputs. This is desirable in order to prevent the motion detectors 58 and 60 from being hyperactive and responding when not needed by increasing the signal to noise ratio. For the frame motion detector 58, the low pass filter 103 and the rectifier 105 are provided to remove the chrominance differences from the output of the summing circuit 95 of the frame comb filter 52 and supply that output as an additional path to the frame motion detector. This secondary leg provides additional motion detection in regions where the primary leg is insensitive. The delay element 111 and the summing circuit 109 form a horizontal expansion circuit, which increases the region covered by the motion detector. In the adaptive combiner 44, separate bandpass filters 83 and 87 are provided in the 1D and 2D outputs, but not in the 3D output, in place of the single band pass filter 62 in FIG. 3 for all three outputs. Eliminating a bandpass filter in the 3D output path avoids cutting into the chrominance bandwidth for signals that are not properly bandwidth limited according to NTSC specifications. Providing separate bandpass filters for the 2D and 1D outputs eliminates certain signal glitches associated with cross fading.

Further details on the nature of the line and frame comb filters 48 and 52 and the transition or motion detectors 58 and 60 are available in the above-referenced Teichner article, the disclosure of which is hereby incorporated by reference herein.

After band pass filtering at 62, the separated chrominance signal from the composite video signal is subtracted from the input composite video signal at 42 to give a separated luminance signal Y on line 64. The separated chrominance signal is demodulated by demodulators 66 and 68 to give an I component on line 70 and a Q component on line 72. Further details on the I and Q component separation are available in Parker, "A Method of Obtaining the Advantages of I and Q Detection with Direct or Color Difference Type Demodulators," (citation to be supplied), pp. 12-18, the disclosure of which is hereby incorporated by reference herein.

Figures 5A, 5B:
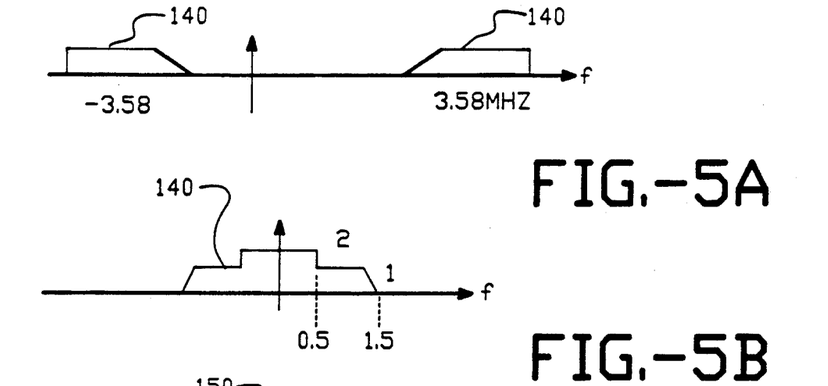
FIGS. 5A-5H are waveform diagrams useful for understanding operation of the invention.
Figure 5C:
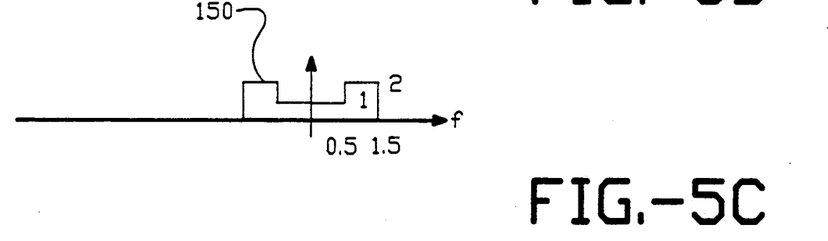
Figures 5D, 5E:
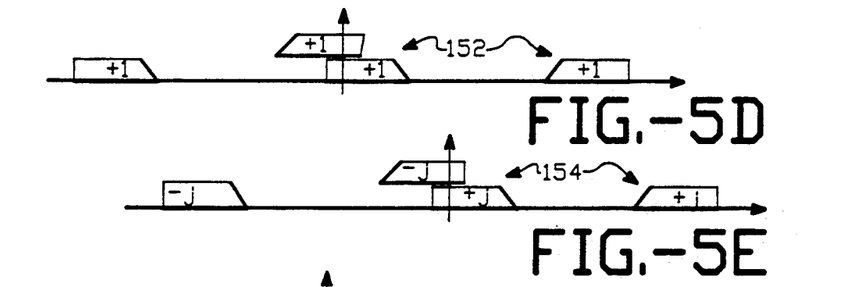
Figure 5F:
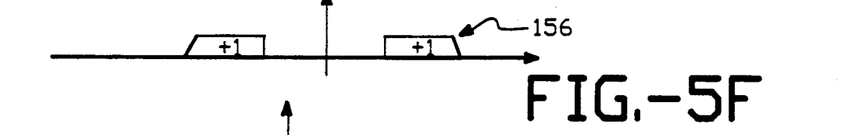
Figure 5G:
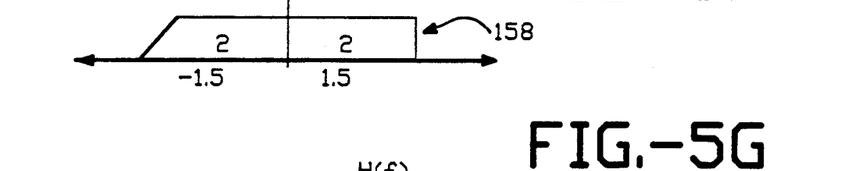

A novel aspect of the I demodulator 66 resides in the recovery of the I component. The most straightforward way to recover I is to demodulate and apply a step filter. FIG. 5A shows the I sidebands 140 of the chroma signal at +/−3.58 MHz before low pass filtering. FIG. 5B shows one of the I sidebands 140 after low pass filtering. In order to recover I, a step filter having the characteristics 150 shown in FIG. 5C should be used. This turns out to be hard to do with a 32-tap digital filter that is decimating 4:1, i.e., originally only 8 taps. It works fine with 64 taps, but this would be too expensive. A single sideband technique is therefore used instead.

The basic approach is to implement the equation cos $(2\pi f_{4sc}t + 33° + \phi_{hue})$, which repeats every 4 samples, and then implement a 32-stage low pass filter, decimating 4:1, with a ZR33891 type digital filter processor integrated circuit. Suppose instead of
$$I = LPF_1 (C * \cos(2\pi f_{4sc}t + 33° + \phi))$$

we instead implement $$I = LPF_1 (C * \cos(2\pi f_{4sc}t + 33° + \phi)) + LPF_2 (C * \sin(2\pi f_{4sc}t + 33° + \phi))$$

wherein LPF$_2$ has a +/−90° phase shift for +/− frequencies, respectively. With Fourier transforms this means that the I sidebands 140 of FIG. 5A times the cosine term gives the signal 152 shown in FIG. 5D. Low pass filtering the signal 152 (LPF$_1$) gives the signal 140 as shown in FIG. 5B. The I sidebands 140 of FIG. 5A times the sin term gives the signal 154 shown in FIG. 5E. Low pass filtering the signal 154 gives the signal 156 shown in FIG. 5F. Adding the signal 156 to the sideband 140 as shown in FIG. 5B gives the signal 158 shown in FIG. 5G.

Figure 5H:
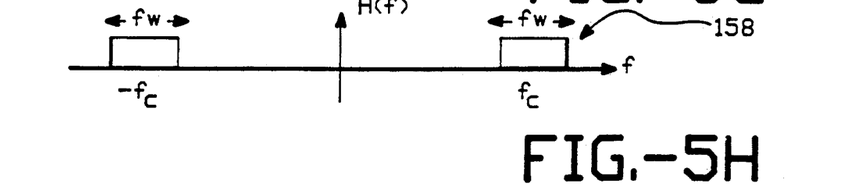

In order to implement this approach, the low pass filter LPF$_2$ requires odd coefficient symmetry. Odd symmetry filters cannot have a DC response, but the spectrum to be filtered does not have DC content, so this is not a problem. FIG. 5H shows output signal 158 of a bandpass filter. To get the impulse response, symmetric: $h(t) = \cos(2\pi f_w t) \cdot \text{sinc}(f_w t)$ antisymmetric: $h(t) = \sin(2\alpha f_w t) \cdot \text{sinc}(f_w t)$, where sinc(x) is defined as $\sin(\pi x)/\pi x$. Now let $f_c = f_w/2$ to make a low pass filter with cutoff frequency $f_w$:

symmetric: $h(t) = \cos(\pi f_w t) \cdot \text{sinc}(f_w t)$
$= \text{sinc}(2f_w t)$ antisymmetric: $h(t) = \sin(\pi f_w t) \cdot \text{sinc}(f_w t)$
$= \sin^2(\pi f_w t)/\pi f_w t)$ Such filters are easily designed with windows. If a window that tapers to 0 is used, such as a Hanning window, then two extra taps are obtained.

Figure 6:
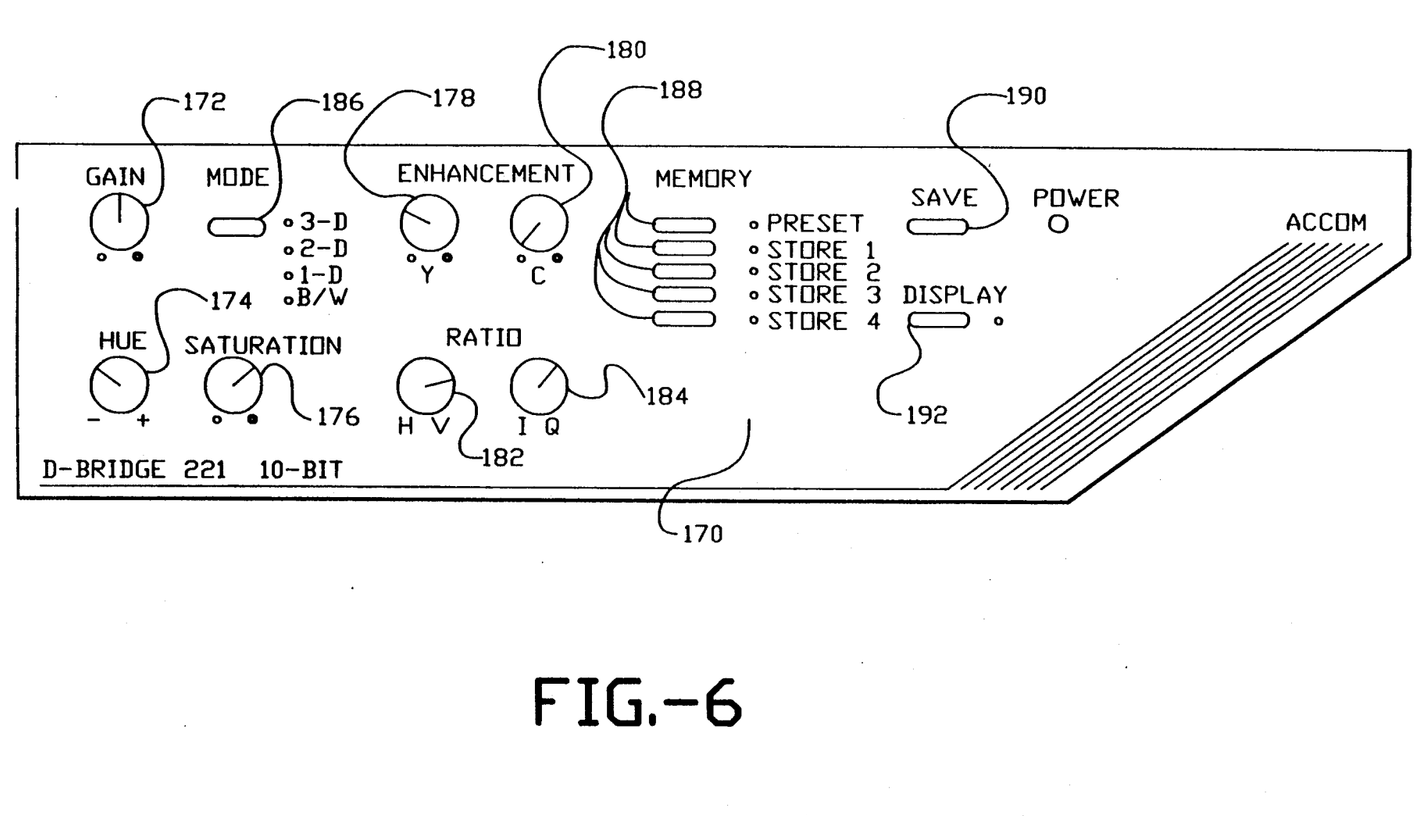
FIG. 6 is a plan view of a control panel for the decoding system of FIGS. 1-4.

FIG. 6 shows a front control panel 170 for the decoding system 10. Knobs 172-184 respectively control rotary potentiometers for adjusting input signal gain, hue, saturation, luminance high frequency enhancement, chrominance high frequency enhancement, luminance horizontal-vertical ratio enhancement and chrominance I-Q ratio enhancement. Gain 172 is variable between −3 dB and +3 dB in 0.25 dB steps. Hue 174 is variable between +/− 15° in 1° steps. Saturation 176 is variable between −3 dB and +3 dB in 0.25 dB steps. Luminance enhancement 178 and 182 is variable between 0-6 dB boost in 0.25 dB steps, with the H/V ratio being variable between 0-100%. Chrominance enhancement 180 and 184 is variable between 0-6 dB boost in 0.25 dB steps, with the I/Q ratio being variable between 0-100%.

Mode switch 186 sequentially cycles among 3-D, 2-D, 1-D and black and white 3-D operation for the adaptive combiner (FIG. 3). The usual mode is 3-D, in which the adaptive combiner selects from 3-D, 2-D and 1-D operation dynamically, based on the analysis of the detectors 58 and 60, as described previously. Black and white 3-D is the corresponding mode for a black and white composite video input signal. Memory switches 188 allow selection among a default set of unity values for the selectable parameters and four preset combinations of the selectable parameters previously stored by the user. Save switch 190 allows a set of selected parameters to be stored as one of the four preset combinations as chosen with the memory switches 88. Display switch 192 will overlay current/chosen preset parameters which are always shown on a separate display overlaid on the video image and also selects which of two video pages are displayed. When a preset combination of parameters is selected, adjustment of the controls 172-184 has no effect, until the adjustment of a parameter passes through its value in the preset combination.

Figure 7:
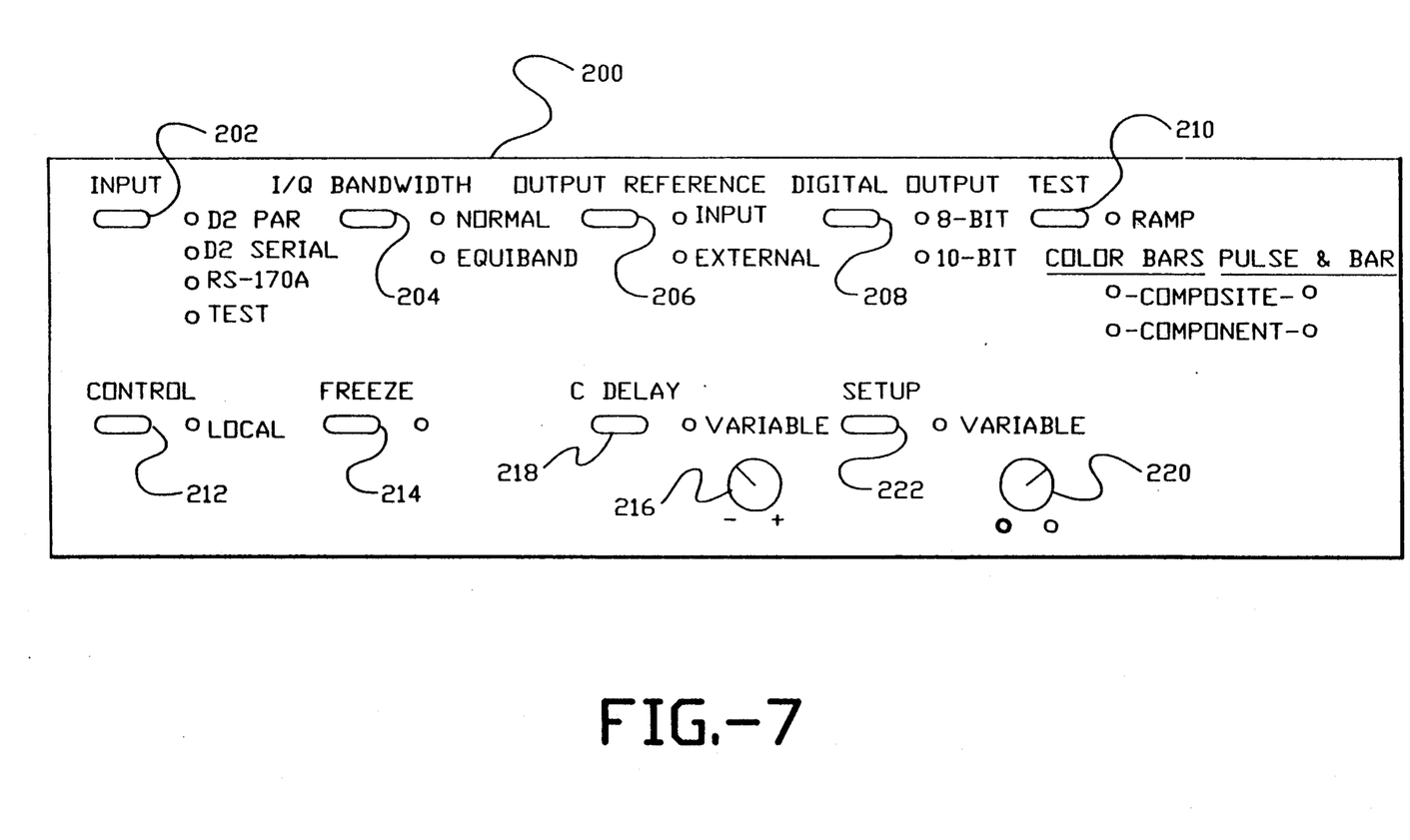
FIG. 7 is a plan view of another control panel for the decoding system of FIGS. 1-4.

FIG. 7 shows an inner control panel 200 for the decoding system 10. Switch 202 allows selection among D2 parallel, D2 serial, RS-170A analog and test signal inputs. I/Q bandwidth switch 204 selects between normal and equiband operation. Switch 206 selects between a reference with the input signal or a separate external reference. Switch 208 selects 8-bit or 10-bit digital output resolution. Switch 210 selects among the indicated test modes. Control switch 212 selects between control from the panels 170 and 200 on the decoding system 10 or the corresponding remote panel 20 (FIG. 1), connected to the decoding system 10 by an RS-422 port. Freeze switch 214 selects the current frame for display until toggled off. Knob 216 and switch 218 select Y/C delay, variable between +/−0.5 microseconds in 9 nanosecond steps. Knob 220 and switch 222 select output setup between 0–15 IRE in 0.5 IRE steps; or pass through. Varying this parameter determines scene black level.

Figure 8:
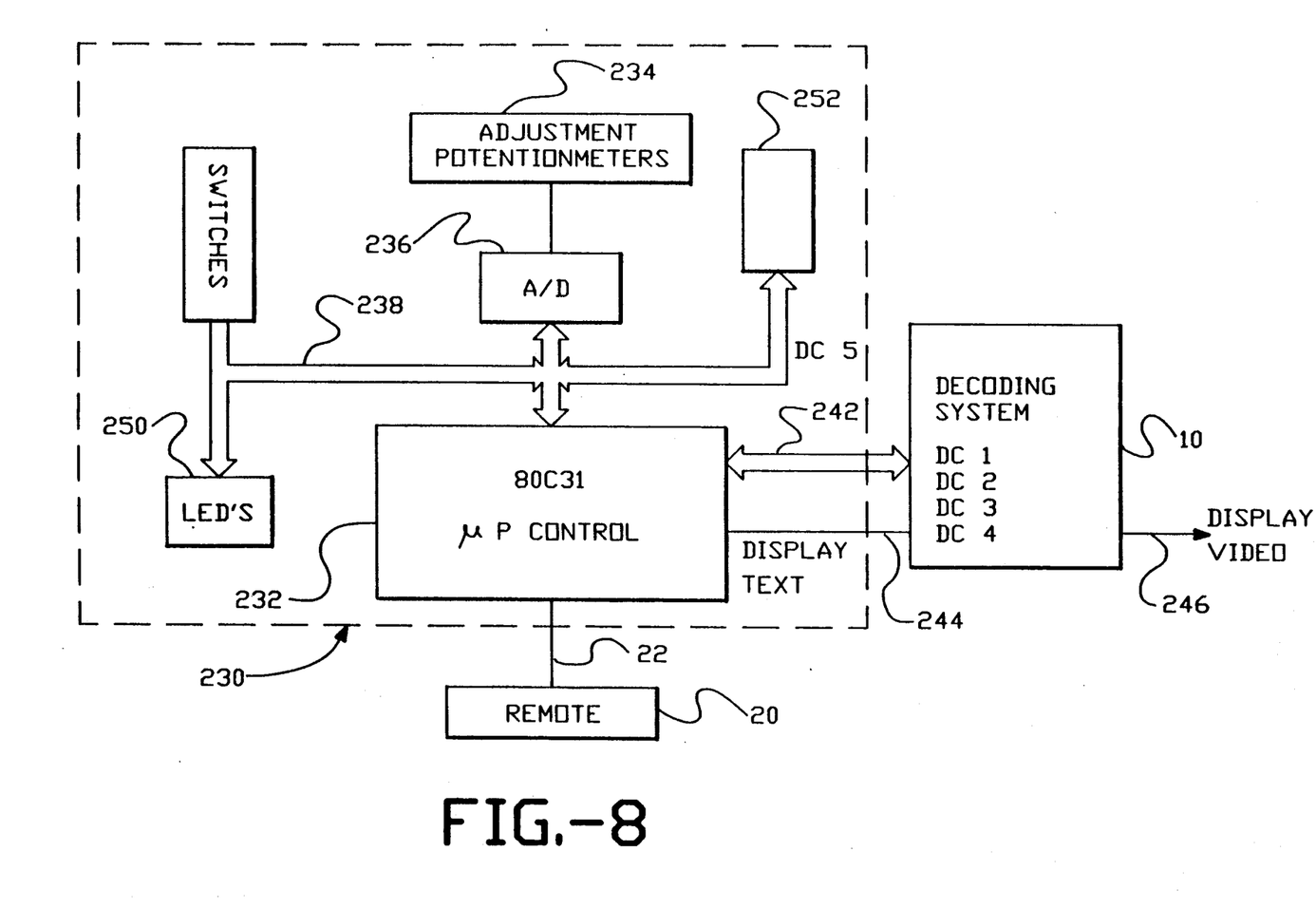
FIG. 8 is a further block diagram of the decoding system of FIGS. 1-4.

FIG. 8 is a block diagram of a control system 230 for the decoding system 10. In the control system 230, an 80C31 type microprocessor integrated circuit 232 receives inputs from adjustment potentiometers 234 of the control panels 170 and 200 through an A/D converter 236 on bus 238. The switches of the control panels 170 and 200 supply inputs to the microprocessor 232 on bus 238. Corresponding inputs are provided by the remote control panel 20 on RS-422 port 22 when remote operation is selected. Bidirectional bus 242 supplies outputs from the microprocessor to the decoding unit 10 and receives inputs for the microprocessor 232 from the decoding unit 10. Line 244 supplies text outputs from the microprocessor 232 for output by the decoding unit on line 246 for separate and overlaid display on a video monitor. Bus 238 provides outputs from the microprocessor 232 for LED's 250 on the control panels 170 and 200.

Appendix I to this description and forming a part hereof is a commented assembler source code listing of a control program for the microprocessor 232, which is stored in a PROM 252 connected to the microprocessor 232 by bus 238. Appendix II to this description and forming a part hereof is a lookup table, also stored in the PROM 252, used with the control program in the microprocessor 232.

It should now be readily apparent to those skilled in the art that a novel three-dimensional adaptive composite video decoding system and method capable of achieving the stated objects of the invention has been provided. In operation, the system and method carries out automatic control of decoding mode within a scene on a line to line and even pixel to pixel basis, determined by characteristics of the video signal being decoded. The system further allows user control of signal parameters on a frame by frame basis. As a result, the video signal composite to component decoding system and method will maintain apparent high image resolution while eliminating visual artifacts which would otherwise be introduced by the decoding. The decoding system and method provides digital control of important video correction and decoding parameters. The decoding system and method does not require any special pre-filtering in the encoding process beforehand.

It should further be apparent to those skilled in the art that various changes in form and details of the invention as shown and described may be made. It is intended that such changes be included within the spirit and scope of the claims appended hereto.

What is claimed is:

1. A composite video signal to component video signal decoding system which comprises a line comb filter and a frame comb filter connected to an input for a composite video signal representing a scene in a plurality of frames, each comprising a plurality of lines, a means for selecting within the scene from the unmodified composite video signal, a line comb filtered output signal from said line comb filter and a frame comb filtered output signal from said frame comb filter, a means, connected to said input for the composite video signal and to said means for selecting, for detecting frame to frame motion or transition within the scene represented by the composite video signal, a means, connected to said input for the composite video signal and to said means for selecting, for detecting line to line motion or transition within the scene represented by the composite video signal, said means for selecting being responsive to said means for detecting frame to frame motion or transition and to said means for detecting line to line motion or transition to select the frame comb filter modified output signal within the scene in the absence of frame to frame motion or transition, to select the line comb filter modified output signal within the scene in the presence of frame to frame motion, but in the absence of line to line motion or transition, and to select the unmodified composite video signal within the scene in the presence of both frame to frame motion and line to line motion or transition, said system including first and second separate band pass filters respectively connected to supply the unmodified composite video signal and the line comb filtered output signal to said means for selecting, said means for selecting being connected to receive said frame comb filtered output signal free of a band pass filter.

2. The composite video signal to component video signal decoding system of claim 1 additionally comprising a means for converting a first video signal at a first sampling rate to a second video signal at a second sampling rate different than the first sampling rate.

3. The composite video signal to component video signal decoding system of claim 1 additionally comprising a control panel including means for user control of at least one video signal decoding parameter on a frame-by-frame basis.

4. The composite video signal to component video signal decoding system of claim 3 additionally comprising a remote control panel coupled to supply control inputs for user control of at least one video signal decoding parameter on a frame-by-frame basis.

5. The composite video signal to component video signal decoding system of claim 3 in which the at least one video signal decoding parameter is gain applied to the composite video signal.

6. The composite video signal to component video signal decoding system of claim 3 in which the at least one video signal decoding parameter is image hue.

7. The composite video signal to component video signal decoding system of claim 3 in which the at least one video signal decoding parameter is image saturation.

8. The composite video signal to component video signal decoding system of claim 3 in which the at least one video signal decoding parameter is luminance enhancement.

9. The composite video signal to component video signal decoding system of claim 3 in which the at least one video signal decoding parameter is chrominance enhancement.

10. The composite video signal to component video signal decoding system of claim 1 in which said means for detecting frame to frame motion or transition within the scene represented by the video signal comprises first means for delaying the composite video signal for one and two frames, first means for taking a difference between the composite video signal undelayed and after delay for two frames, said first means for taking a difference being connected to said first means for delaying, a third bandpass filter connected to said first means for taking a difference, first means, connected to said third bandpass filter, for rectifying a differenced output signal from said first means for taking a difference, second means, connected to said first means for rectifying, for delaying a rectified output signal from said first means for rectifying for one frame, a first summing circuit connected to said first means for rectifying and to said second means for delaying, a second summing circuit connected to said first summing circuit, said second summing circuit also being connected to receive the frame comb filtered output signal, an output of said second summing circuit providing a control signal for said means for selecting.

11. The composite video signal to component video signal decoding system of claim 10 in which said comparator is connected to receive the frame comb filtered output signal through a low pass filter and a second means for rectifying.

12. The composite video signal to component video signal decoding system of claim 10 in which the output of said comparator is connected to said means for selecting through a horizontal expansion circuit and a threshold detector circuit.

13. The composite video signal to component video signal decoding system of claim 10 in which said means for detecting line to line motion or transition comprises a third means for delaying said composite video signal for two lines, a second means for taking a difference between said composite video signal prior to and after delay by said third means for delaying, a fourth bandpass filter connected to said second means for taking a difference, third means, connected to said fourth bandpass filter, for rectifying a differenced output signal from said second means for taking a difference, fourth means, connected to said third means for rectifying, for delaying a rectified output signal from said third means for rectifying for one line, a summing circuit connected to said third means for rectifying and to said fourth means for delaying, an output of said summing circuit providing a second control signal for said means for selecting.

14. A composite video signal to component video signal decoding system which comprises a line comb filter and a frame comb filter connected to an input for a composite video signal representing a scene in a plurality of frames, each comprising a plurality of lines, a means for selecting within the scene from the unmodified composite video signal, a line comb filtered output signal from said line comb filter and a frame comb filtered output signal from said frame comb filter, a means, connected to said input for the composite video signal and to said means for selecting, for detecting frame to frame motion or transition within the scene represented by the composite video signal, a means, connected to said input for the composite video signal and to said means for selecting, for detecting line to line motion or transition within the scene represented by the composite video signal, said means for selecting being responsive to said means for detecting frame to frame motion or transition and to said means for detecting line to line motion or transition to select the frame comb filter modified output signal within the scene in the absence of frame to frame motion or transition, to select the line comb filter modified output signal within the scene in the presence of frame to frame motion, but in the absence of line to line motion or transition, and to select the unmodified composite video signal within the scene in the presence of both frame to frame motion and line to line motion or transition, said video decoding system including inputs for a digital composite video signal and an analog composite video signal.

15. A composite video signal to component video signal decoding system which comprises a line comb filter and a frame comb filter connected to an input for a composite video signal representing a scene in a plurality of frames, each comprising a plurality of lines, a means for selecting within the scene from the unmodified composite video signal, a line comb filtered output signal from said line comb filter and a frame comb filtered output signal from said frame comb filter, a means, connected said input for the composite video signal and to said means for selecting, for detecting frame to frame motion or transition within the scene represented by the composite video signal, a means, connected to said input for the composite video signal and to said means for selecting, for detecting line to line motion or transition within the scene represented by the composite video signal, said means for selecting being responsive to said means for detecting frame to frame motion or transition and to said means for detecting line to line motion or transition to select the frame comb filter modified output signal within the scene in the absence of frame to frame motion or transition, to select the line comb filter modified output signal within the scene in the presence of frame to frame motion, but in the absence of line to line motion or transition, and to select the unmodified composite video signal within the scene in the presence of both frame to frame motion and line to line motion or transition, said system additionally comprising a control panel including means for user control of at least one video signal decoding parameter on a frame-by-frame basis, the at least one video signal decoding parameter including horizontal-vertical ratio.

16. A composite video signal to component video signal decoding system which comprises a line comb filter and a frame comb filter connected to an input for a composite video signal representing a scene in a plurality of frames, each comprising a plurality of lines, a means for selecting within the scene from the unmodified composite video signal, a line comb filtered output signal from said line comb filter and a frame comb filtered output signal from said frame comb filter, a means, connected to said input for the composite video signal and to said means for selecting, for detecting frame to frame motion or transition within the scene represented by the composite video signal, a means, connected to said input for the composite video signal and to said means for selecting, for detecting line to line motion or transition within the scene represented by the composite video signal, said means for selecting being responsive to said means for detecting frame to frame motion or transition and to said means for detecting line to line motion or transition to select the frame comb filter modified output signal within the scene in the absence of frame to frame motion or transition, to select the lien comb filter modified output signal within the scene in the presence of frame to frame motion, but in the scene in the presence of both frame to frame motion and line to line motion or transition, said system additionally comprising a control panel including means for user control of at least one video signal decoding parameter on a frame-by-frame basis, the at least one video signal decoding parameter including I-Q ration.

17. A composite video signal to component video signal decoding system which comprises a line comb filter and a frame comb filter connected to an input for a composite video signal representing a scene in a plurality of frames, each comprising a plurality of lines, a means for selecting within the scene from the unmodified composite video signal, a line comb filtered output signal from said line comb filter and a frame comb filtered output signal from said frame comb filter, a means, connected to said input for the composite video signal and to said means for selecting, for detecting frame to frame motion or transition within the scene represented by the composite video signal, a means, connected to said input for the composite video signal and to said means for selecting, for detecting line to line motion or transition within the scene represented by the composite video signal, said means for selecting being responsive to said means for detecting frame to frame motion or transition and to said means for detecting line to line motion or transition to select the frame comb filter modified output signal within the scene in the absence of frame to frame motion or transition, to select the line comb filter modified output signal within the scene in the presence of frame to frame motion, but in the absence of line to line motion or transition, and to select the unmodified composite video signal within the scene in the presence of both frame to frame motion and line to line motion or transition, said system additionally comprising a control panel including means for user control of at least one video signal decoding parameter on a frame-by-frame basis, the at least one video signal decoding parameter including chrominance delay.

18. A composite video signal to component video signal decoding system which comprises a line comb filter and a frame comb filter connected to an input for a composite video signal representing a scene in a plurality of frames, each comprising a plurality of lines, a means for selecting within the scene from the unmodified composite video signal, a line comb filtered output signal from said line comb filter and a frame comb filtered output signal from said frame comb filter, a means, connected to said input for the composite video signal and to said means for selecting, for detecting frame to frame motion or transition within the scene represented by the composite video signal, a means, connected to said input for the composite video signal and to said means for selecting, for detecting line to line motion or transition within the scene represented by the composite video signal, said means for selecting being responsive to said means for detecting frame to frame motion or transition and to said means for detecting line to line motion or transition to select the frame comb filter modified output signal within the scene in the absence of frame to frame motion or transition, to select the line comb filter modified output signal within the scene in the presence of frame to frame motion, but in the absence of line to line motion or transition, and to select the unmodified composite video signal within the scene in the presence of both frame to frame motion and line to line motion or transition, said system additionally comprising a control panel including means for user control of at least one video signal decoding parameter on a frame-by-frame basis, the at least one video signal decoding parameter including setup.

19. A composite video signal to component video signal decoding system which comprises a line comb filter and a frame comb filter connected to an input for a composite video signal representing a scene in a plurality of frames, each comprising a plurality of liens, a means for selecting within the scene from the unmodified composite video signal, a line comb filtered output signal from said line comb filter and a frame comb filtered output signal from said frame comb filter, a means, connected to said input for the composite video signal and to said means for selecting, for detecting frame to frame motion or transition within the scene represented by the composite video signal, a means, connected to said input for the composite video signal and to said means for selecting, for detecting line to line motion or transition within the scene represented by the composite video signal, said means for selecting being responsive to said means for detecting frame to frame motion or transition and to said means for detecting line to line motion or transition to select the frame comb filter modified output signal within the scene in the absence of frame to frame motion or transition, to select the line comb filter modified output signal within the scene in the presence of frame to frame motion, but in the absence of line to line motion or transition, and to select the unmodified composite video signal within the scene in the presence of both frame to frame motion and line to line motion or transition, said system additionally comprising a control panel including means for user control of at least one video signal decoding parameter on a frame-by-frame basis, said control panel including a user input for storing at least one set of video signal decoding parameters.

20. In a composite video signal to component video signal decoding system, a control panel including means for user control of at least one video signal decoding parameter on a frame-by-frame basis and inputs to said video system for a digital composite video signal and an analog composite video signal.

21. The composite video signal to component video signal decoding system of claim 20 additionally comprising a remote control panel coupled to supply control inputs for user control of at least one video signal decoding parameter on a frame-by-frame basis.

22. The composite video signal to component video signal decoding system of claim 20 in which the at least one video signal decoding parameter is gain applied to the composite video signal.

23. The composite video signal to component video signal decoding system of claim 20 in which the at least one video signal decoding parameter is image hue.

24. The composite video signal to component video signal decoding system of claim 20 in which the at least one video signal decoding parameter is image saturation.

25. The composite video signal to component video signal decoding system of claim 20 in which the at least one video signal decoding parameter is luminance enhancement.

26. The composite video signal to component video signal decoding system of claim 20 in which the at least one video signal decoding parameter is chrominance enhancement.

27. In a composite video signal to component video signal decoding system, a control panel including means for user control of at least one video signal decoding parameter on a frame-by-frame basis, the at least one video signal decoding parameter including horizontal-vertical ratio.

28. In a composite video signal to component video signal decoding system, a control panel including means for user control of at lest one video signal decoding parameter on a frame-by-frame basis, the at lest one video signal decoding parameter including I-Q ratio.

29. In a composite video signal to component video signal decoding system, a control panel including means for user control of at lest one video signal decoding parameter on a frame-by-frame basis, the at least one video signal decoding parameter including chrominance delay.

30. In a composite video signal to component video signal decoding system, a control panel including means for user control of at lest one video signal decoding parameter on a frame-by-frame basis, the at least one video signal decoding parameter including setup.

31. In a composite video signal to component video signal decoding system, a control panel including means for user control of at lest one video signal decoding parameter on a frame-by-frame basis, said control panel including a user input for storing at least one set of video signal decoding parameters.

32. In a process for decoding a composite video signal representing a scene in a plurality of frames each comprising a plurality of lines to a component video signal, the steps of filtering the composite video signal with a line comb filter, filtering the composite video signal with a frame comb filter, evaluating the composite video signal within the scene for frame to frame motion or transition, evaluating the composite video signal within the scene for line to line motion or transition, separately band pass filtering the unmodified composite video signal and the line comb filtered output signal, providing said frame comb filtered output signal free of band pass filtering, selecting the frame comb filter modified output signal within the scene in the absence of frame to frame motion or transition, selecting the line comb filter modified output signal within the scene in the presence of frame to frame motion, but in the absence of line to line motion or transition, and selecting the unmodified composite video signal within the scene in the presence of both frame to frame motion and line to lien motion or transition.

33. The process for decoding a composite video signal to a component video signal of claim 32 additionally comprising converting a first video signal at a first sampling rate to a second video signal at a second sampling rate different than the first sampling rate.

34. The process for decoding a composite video signal to a component video signal of claim 32 additionally comprising providing user control of at least one video signal decoding parameter on a frame-by-frame basis.

35. The process for decoding a composite video signal to a component video signal of claim 32 in which the at least one video signal decoding parameter is gain applied to the composite video signal.

36. The process for decoding a composite video signal to a component video signal of claim 32 in which the at least one video signal decoding parameter is image hue.

37. The process for decoding a composite video signal to a component video signal of claim 32 in which the at lest one video signal decoding parameter is image saturation.

38. The process for decoding a composite video signal to a component video signal of claim 32 in which the at least one video signal decoding parameter is luminance enhancement.

39. The process for decoding a composite video signal to a component video signal of claim 32 in which the at lest one video signal decoding parameter is chrominance enhancement.

40. In a process for decoding a composite video signal representing a scene in a plurality of frames each comprising a plurality of lines to a component video signal, the steps of filtering the composite video signal with a lien comb filter, filtering the composite video signal with a frame comb filter, evaluating the composite video signal within the scene for frame to frame motion or transition, evaluating the composite video signal within the scene for line to line motion or transition, selecting the frame comb filter modified output signal within the scene in the absence of frame to frame motion or transition, selecting the line comb filter modified output signal within the scene in the presence of frame to frame motion, but in the absence of line to line motion or transition, and selecting the unmodified composite video signal within the scene in the presence of both frame to frame motion and line to line motion or transition, providing user control of at least one video signal decoding parameter on a frame-by-frame basis, the at least one video signal decoding parameter including horizontal-vertical ratio.

41. In a process for decoding a composite video signal representing a scene in a plurality of frames each comprising a plurality of lines to a component video signal, the steps of filtering the composite video signal with a line comb filter, filtering the composite video signal with a frame comb filter, evaluating the composite video signal within the scene for frame to frame motion or transition, evaluating the composite video signal within the scene for line to lien motion or transition, selecting the frame comb filter modified output signal within the scene int eh absence of frame to frame motion or transition, selecting the line comb filter modified output signal within the scene in the presence of frame to frame motion, but in the absence of line to line motion or transition, and selecting the unmodified composite video signal within the scene int eh presence of both frame to frame motion and lien to lien motion or transition, providing user control of at least one video signal decoding parameter on a frame-by-frame basis, the at least one video signal decoding parameter including I-Q ratio.

42. In a process for decoding a composite video signal representing a scene in a plurality of frames each comprising a plurality of lines to a component video signal, the steps of filtering the composite video signal with a line comb filter, filtering the composite video signal with a frame comb filter, evaluating the composite video signal within the scene for frame to frame motion or transition, evaluating the composite video signal within the scene for line to line motion or transition, selecting the frame comb filter modified output signal within the scene in the absence of frame to frame motion or transition, selecting the line comb filter modified output signal within the scene in the presence of frame to frame motion, but in the absence of line to line motion or transition, and selecting the unmodified composite video signal within the scene in the presence of both frame of frame motion and line to line motion or transition, providing user control of at least one video signal decoding parameter on a frame-by-frame basis, the at least one video signal decoding parameter including chrominace delay.

43. In a process for decoding a composite video signal representing a scene in a plurality of frames each comprising a plurality of lines to a component video signal, the steps of filtering the composite video signal with a line comb filter, filtering the composite video signal with a frame comb filter, evaluating the composite video signal within the scene for frame to frame motion or transition, evaluating the composite video signal within the scene for lien to line motion or transition, selecting the frame comb filter modified output signal within the scene in the ahsence of frame to frame motion or transition, selecting the line comb filter modified output signal within the scene in the presence of frame to frame motion, but in the absence of line to line motion or transition, and selecting the unmodified composite video signal within the scene in the presence of both frame to frame motion and line to line motion or transition, providing user control of at least one video signal decoding parameter on a frame-by-frame basis, the at least one video signal decoding parameter including setup.

44. In a process for decoding a composite video signal representing a scene in a plurality of frames each comprising a plurality of liens to a component video signal, the steps of filtering the composite video signal with a line comb filter, filtering the composite video signal with a frame comb filter, evaluating the composite video signal within the scene for frame of frame motion or transition, evaluating the composite video signal within the scene for lien to line motion or transition, selecting the frame comb filter modified output signal within the scene int eh absence of frame to frame motion or transition, selecting the line comb filter modified output signal within the scene in the presence of frame to frame motion, but in the absence of line to lien motion or transition, and selecting the unmodified composite video signal within the scene in the presence of both frame to frame motion and line to line motion or transition, and providing a user input for storing at least one set of video signal decoding parameters.

45. In a process for decoding a composite video signal representing a scene in a plurality of frames each comprising a plurality of lines to a component video signal, the steps of filtering the composite video signal with a lien comb filter, filtering the composite video signal with a frame comb filter, evaluating the composite video signal within the scene for frame to frame motion or transition, evaluating the composite video signal within the scene for line to line motion or transition, selecting the frame comb filter modified output signal within the scene in the absence of frame to frame motion or transition, selecting the line comb filter modified output signal within the scene in the presence of frame to frame motion, but in the absence of line to line motion or transition, and selecting the unmodified composite video signal within the scene in the presence of both frame to frame motion and line to line motion or transition, the composite video signal being evaluated from frame to frame motion or transition by delaying the composite video signal for one and two frames, taking the difference between the composite video signal undelayed and after delay for the two frames to give a differenced output signal, rectifying the differenced output signal to give a first rectified output signal, delaying the first rectified output signal for one frame to give a delayed first rectified output signal, adding the first rectified output signal and the delayed first rectified output signal to give their sum, adding the sum of the first rectified output signal and the delayed first rectified output signal to the frame comb filter modified output signal to give a selection output signal, and using the selection output signal within the scene in the absence of frame to frame motion or transition.

46. The process for decoding a composite video signal to a component video signal of claim 45 additionally comprising the steps of low pass filtering and rectifying the frame comb filter modified output signal prior to comparing with the sum of the first rectified output signal and the delayed first rectified output signal.

47. The process for decoding a composite video signal to a component video signal of claim 45 additionally comprising the step of horizontally expanding a result of the comparison.

48. The process for decoding a composite video signal to a component video signal of claim 45 additionally comprising the step of band pass filtering the differenced output signal prior to rectifying.

49. The process for decoding a composite video signal to a component video signal of claim 48 in which the frame comb filter modified output signal is low pass filtered and rectified prior to comparing.

50. The process for decoding a composite video signal to a component video signal of claim 45 in which the composite video signal is evaluated for line to line motion or transition by delaying the composite video signal for two liens, taking the difference between the composite video signal prior to and after delay to give a differenced output signal, rectifying the differenced output signal, delaying the differenced output signal for one line to give a delayed differenced output signal, and adding the differenced output signal and the delayed differenced output signal to give a control signal for selecting between the line comb filter modified output signal and the unmodified composite video signal.

51. The process for decoding a composite video signal to a component video signal of claim 50 in which the differenced output signal is band pass filtered prior to rectifying.

52. The process for decoding a composite video signal to a component video signal of claim 48 in which the unmodified composite video signal and the line comb filtered output signal are separately band pass filtered prior to their selection.

* * * * *